(12) United States Patent
Simpson et al.

(10) Patent No.: US 7,475,535 B2
(45) Date of Patent: *Jan. 13, 2009

(54) DIESEL AFTERTREATMENT SYSTEMS

(75) Inventors: Paul Simpson, Benfleet (GB); David Arthur Ketcher, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

This patent is subject to a terminal disclaimer.

(21) Appl. No.: 11/111,354

(22) Filed: Apr. 21, 2005

(65) Prior Publication Data

US 2005/0217247 A1    Oct. 6, 2005

(51) Int. Cl.
*F01N 3/00* (2006.01)
(52) U.S. Cl. .............................. 60/286; 60/274; 60/285; 60/295; 60/301
(58) Field of Classification Search ................... 60/274, 60/276, 285, 286, 295, 297, 301, 303
See application file for complete search history.

(56) References Cited

U.S. PATENT DOCUMENTS

| | | | | | |
|---|---|---|---|---|---|
| 5,437,153 | A | * | 8/1995 | Takeshima et al. | 60/276 |
| 5,806,310 | A | * | 9/1998 | Daidou et al. | 60/286 |
| 5,842,341 | A | * | 12/1998 | Kibe | 60/274 |
| 5,884,476 | A | * | 3/1999 | Hirota et al. | 60/278 |
| 6,167,698 | B1 | * | 1/2001 | King et al. | 60/286 |
| 6,199,374 | B1 | * | 3/2001 | Hirota et al. | 60/277 |
| 6,311,484 | B1 | * | 11/2001 | Roth et al. | 60/301 |
| 6,446,430 | B1 | * | 9/2002 | Roth et al. | 60/286 |

* cited by examiner

*Primary Examiner*—Binh Q. Tran
(74) *Attorney, Agent, or Firm*—Julia Voutyras; Allan J. Lippa

(57) ABSTRACT

A method for improving NOx conversion efficiency of a Nox-reducing catalyst by determining an accurate amount of reductant required is presented. The method includes calculating an initial reductant injection amount based on a steady state amount of NOx in the engine feedgas and adjusting the initial amount to compensate for transient NOx emissions. The compensation is initiated in response to an engine transient, such as impending acceleration or deceleration. This method further results in improved vehicle fuel economy.

15 Claims, 5 Drawing Sheets

DIESEL AFTERTREATMENT SYSTEMS

BACKGROUND OF INVENTION

1. Field of Invention

The present invention relates to a system and a method for improving performance of a lean exhaust gas aftertreatment device and, more particularly, to controlling an amount of reductant injection to achieve optimum NOx conversion efficiency while minimizing the fuel economy penalty.

2. Background of the Invention

Current emission control regulations necessitate the use of catalysts in the exhaust systems of automotive vehicles in order to convert carbon monoxide (CO), hydrocarbons (HC), and nitrogen oxides (NOx.) produced during engine operation into harmless exhaust gasses. Vehicles equipped with diesel or lean gasoline engines offer the benefits of increased fuel economy. Such vehicles have to be equipped with lean exhaust aftertreatment devices, such as, for example, an Active Lean NOx Catalysts (ALNC) or Selective Catalytic Reduction (SCR) catalysts, which continuously reduce NOx emissions, even in an oxygen rich environment, through active injection of reductant, such as fuel (HC) or urea, into the exhaust gas entering these devices. Further, it is important to precisely control the amounts of reductant in order to achieve maximum NOx conversion efficiency.

The inventors herein have recognized that transient changes in engine operating conditions cause changes in engine feedgas NOx production. For example, NOx production usually increases during engine acceleration, and decreases during deceleration. Since the amount of reductant injection is typically calculated based on steady state engine operating conditions, these transient NOx variations result in over or under-injection of reductant and negatively impact fuel economy and emission standards.

SUMMARY OF INVENTION

The objects and advantages described herein will be more fully understood by reading an example of an embodiment in which the invention is used to advantage, referred to herein as the Description of Preferred Embodiment, with reference to the drawings, wherein.

Figure 3:
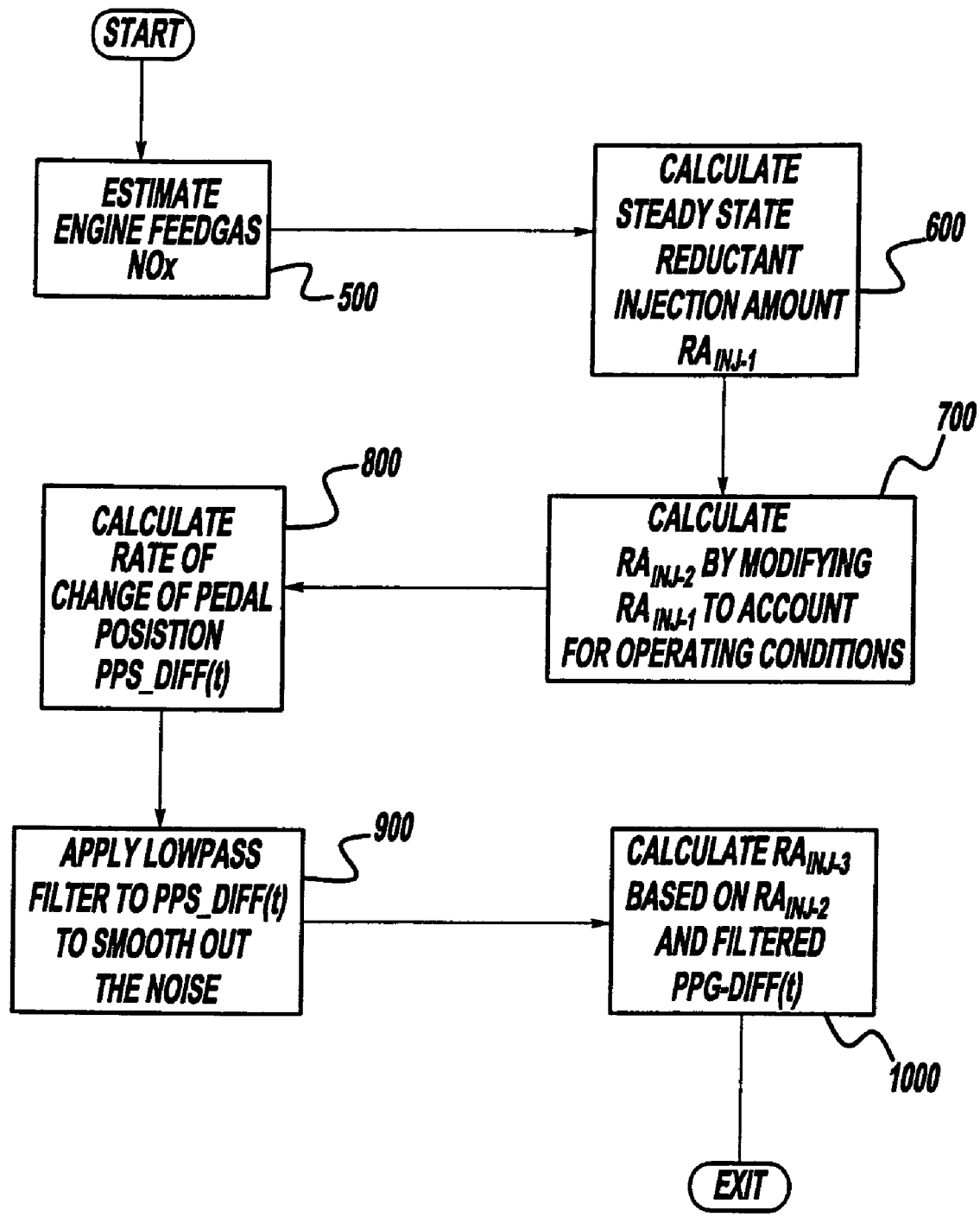
Figure 4:
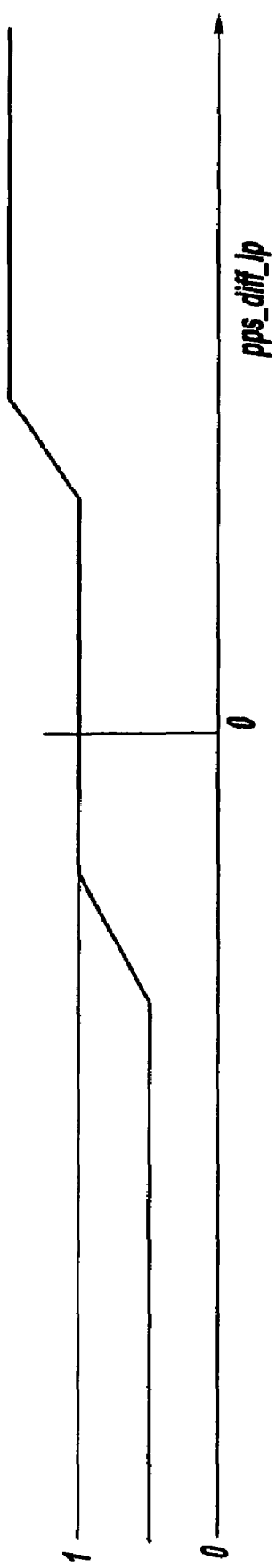

FIGS. 3 and 4 describe an exemplary routine and a modification curve for determining an amount of reductant to be delivered to the exhaust gas aftertreatment device in accordance with the present invention.

DESCRIPTION OF PREFERRED EMBODIMENT(S)

Figure 1A:
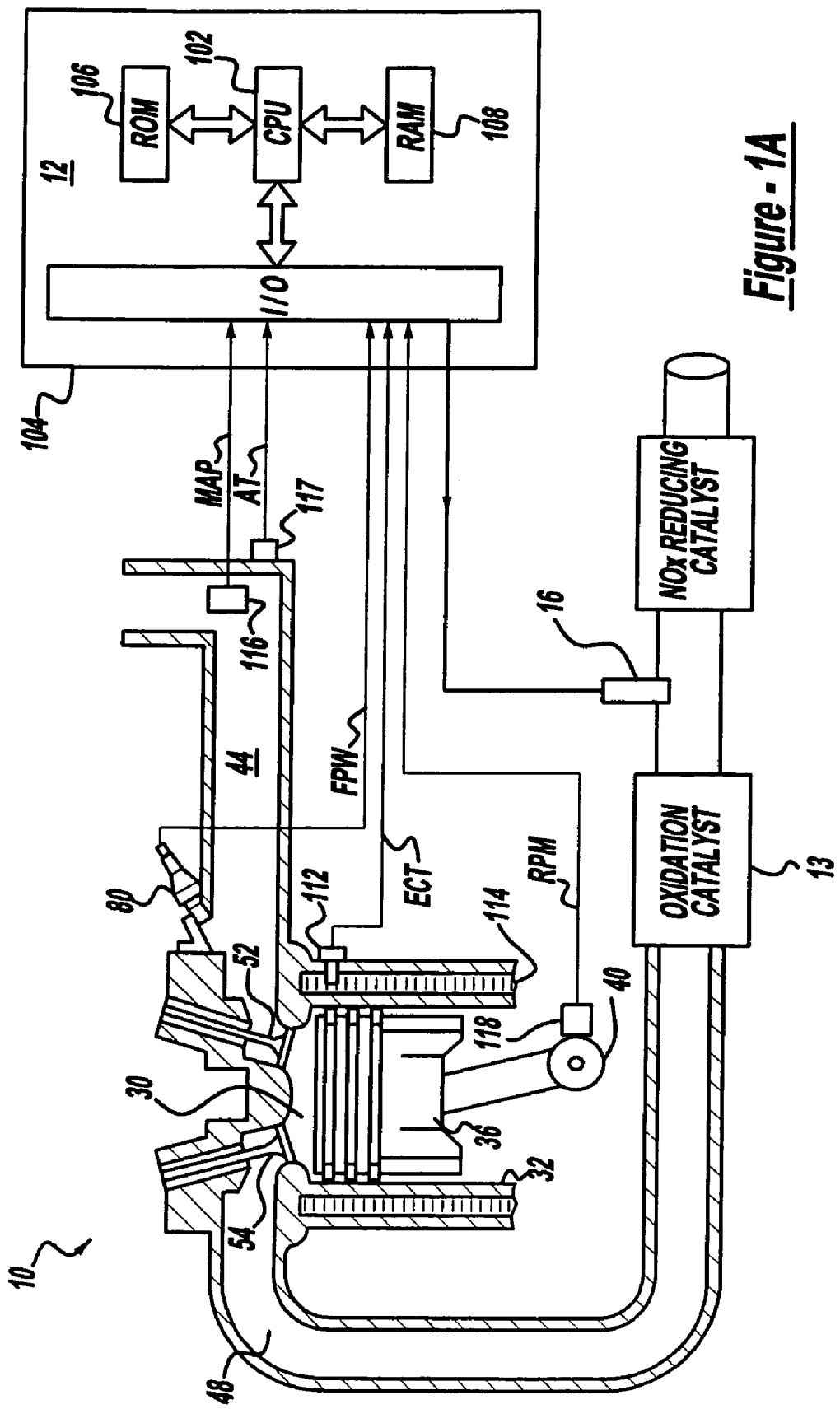
FIGS. 1A and 1B are schematic diagrams of an engine wherein the invention is used to advantage.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system including a fuel tank, fuel pump, and fuel rail (not shown).

Controller 12 is shown in FIG. 1A as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

Oxidation catalyst 13 is coupled to the exhaust manifold 48 downstream of engine 10 and may be a precious metal catalyst, preferably one containing platinum. Catalyst 14, a NOx-reducing catalyst capable of reducing NOx in an oxygen rich environment, is coupled downstream of the oxidation catalyst. In a preferred embodiment Catalyst 14 is an Active Lean NOx Catalyst (ALNC) comprising a precious metal or a combination of precious metals, such as Platinum or Palladium, an acidic support material, such as the one containing alumina and silica, and a zeolite material. In an alternative embodiment, catalyst 14 may be a urea-based Selective Catalytic Reduction (SCR) catalyst, which is a device comprising some or all of the features of the ALNC catalyst and optimized for use with urea or other ammonia-based compounds as reductant. The oxidation catalyst 13 exothermically combusts hydrocarbons (HC) in the incoming exhaust gas from the engine thus supplying heat to rapidly warm up catalyst 14. Additionally, carbon monoxide (CO) produced as a result of HC combustion in the oxidation catalyst 13 improves NOx reduction in the catalyst 14.

A reductant delivery system 16 is coupled to the exhaust gas manifold between the oxidation catalyst and the NOx-reducing catalyst and is described in more detail in FIG. 2 below. Alternatively, reductant delivery system 16 may be any system known to those skilled in the art capable of supplying reductant to the NOx-reducing catalyst. In a preferred embodiment, reductant delivery system injects fuel (hydrocarbon) into the exhaust gas mixture entering catalyst 14. Alternatively, reductant delivery system 16 may supply aqueous urea to the NOx-reducing catalyst.

Figure 1B:
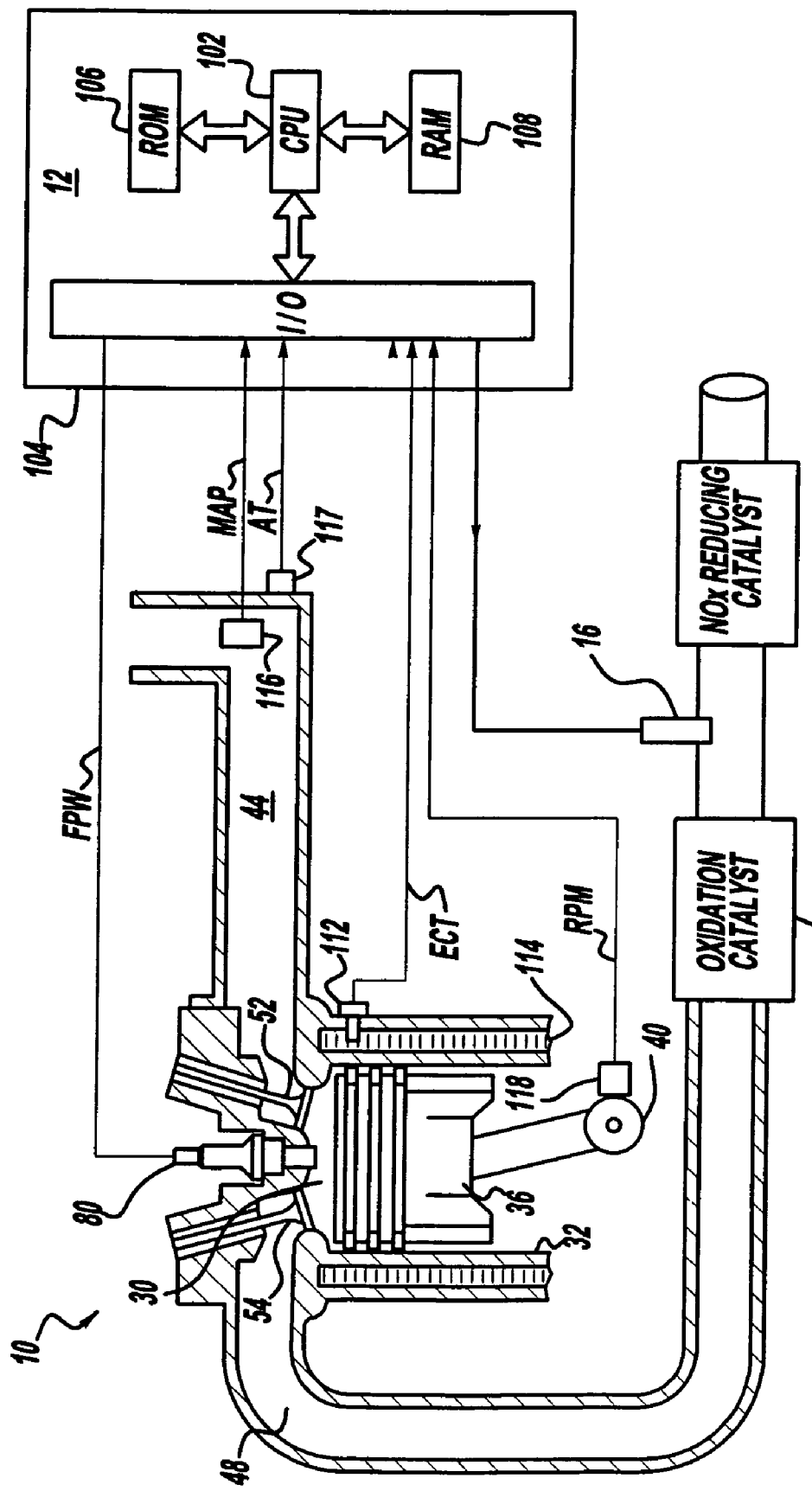

Referring now to FIG. 1B, an alternative embodiment is shown where engine 10 is a direct injection engine with injector 80 located to inject fuel directly into cylinder 30.

Figure 2:
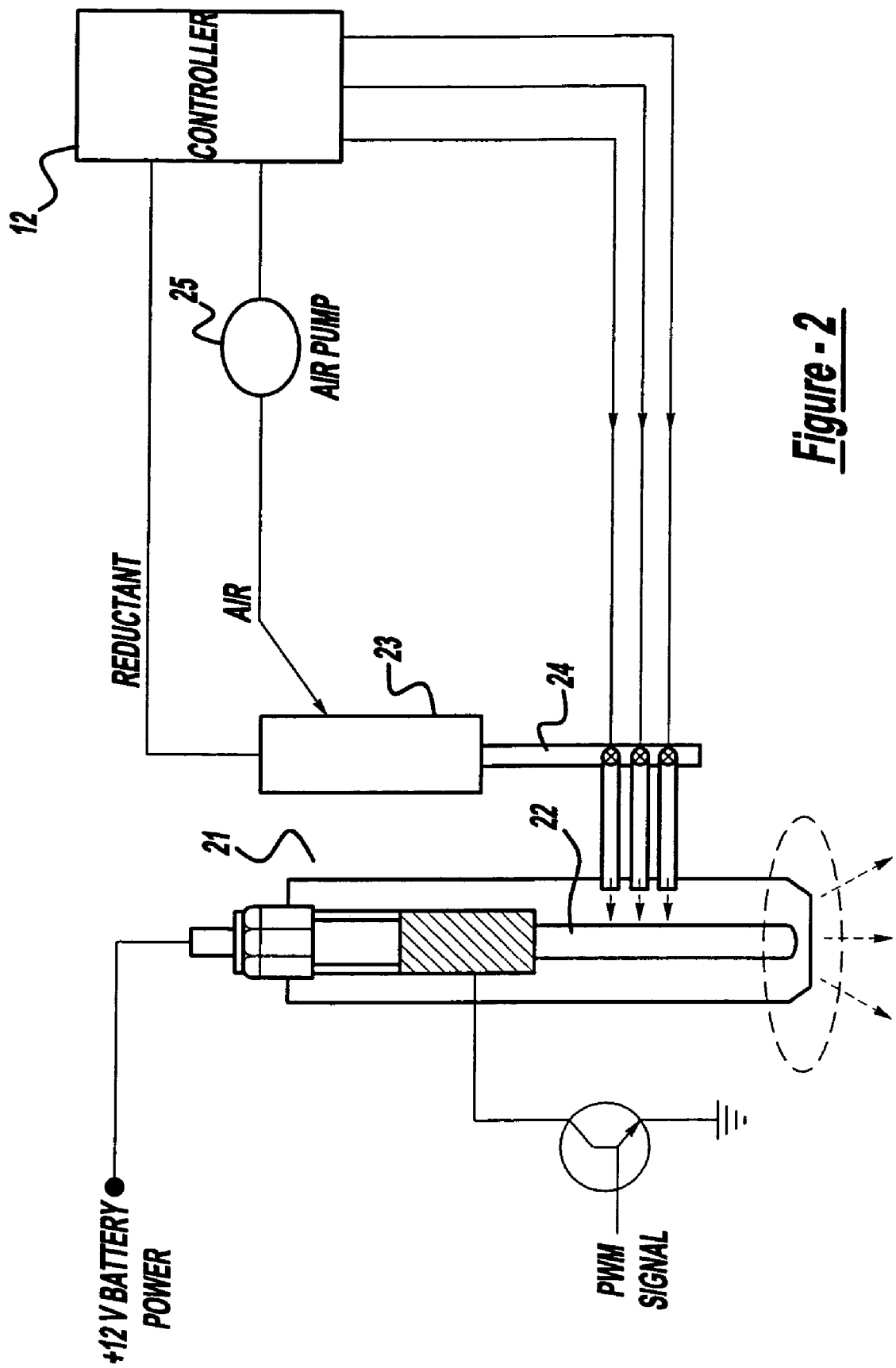
FIG. 2 is an example of a reductant delivery system used to advantage with the present invention.

The diagram of FIG. 2 generally represents an example of one embodiment of a reductant delivery system according to the present invention. The system comprises an evaporator unit 21 housing an elongated heating element 22. The mixing unit 23 has a reductant inlet and an air inlet and an outlet 24 coupled to the evaporator unit 21 through which a mixture of reductant and air is injected into the housing and subsequently comes into contact with the surface of the heating element 22. Alternatively, both air and reductant can be injected through a single input. The reductant can be supplied to the mixing unit 23 from the fuel tank or from a storage vessel. Air pump 25 supplies pressurized air to the mixing unit 23 thereby creating a mixture of reductant and air. Outlet 24 is configured to deliver the reductant and air mixture to more than one area on the surface of the heating element.

Controller 12 can selectively enable and disable injection of the mixture to these areas depending on operating conditions, such as engine speed, load, exhaust gas temperature, etc. For example, when the amount of reductant required is high, such as at high load conditions, it may be necessary to enable delivery of the reductant and air mixture to more than one area on the surface of the heating element. Alternatively, outlet 24 may be configured to deliver the reductant and air mixture to a specific area on the surface of the heating element.

As will be appreciated by one of ordinary skill in the art, the routines described in FIGS. 3 and 4 below may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Referring now to FIG. 3, an exemplary routine for controlling injection of a reductant into exhaust flow is presented. First, in step 500, the amount of NOx in the exhaust gas mixture entering the device, $NOx_{fg}$, is estimated based on engine operating conditions. These conditions may include engine speed, engine load, exhaust temperatures, exhaust gas aftertreatment device temperatures, injection timing, engine temperature, and any other parameter know to those skilled in the art to indicate the amount of NOx produced by the combustion presses. Alternatively, a NOx sensor may be used to measure the amount of NOx in the exhaust gas mixture. Next, in step 600, the steady-state reductant injection amount, $RA_{inj\_1}$, is calculated based on the following equation:

$$\frac{(RA_{fg} + RA_{inj\_1})}{NOx_{fg}} = R_{des}$$

wherein $RA_{fg}$ is the amount of reductant in the engine feedgas, which can be determined based on engine operating conditions. This initial reductant amount, $RA_{inj\_1}$, is evaluated at steady state and yields a base reductant quantity to be injected for each engine speed and load point. The amount is calibrated to achieve a certain feedgas reductant to NOx ratio, $R_{des}$. The ratio is typically obtained as a trade-off between NOx conversion and the fuel penalty due to reductant injection, and in this example is set at approximately 10. Next, in step 700, the steady-state base reductant injection amount, $RA_{inj\_1}$, is modified to account for engine operating conditions, such as engine coolant temperature, $T_c$, exhaust gas temperature, $T_{eg}$, EGR valve position, $EGR_{pos}$, start of injection, SOI, and other parameters:

$$RA_{inj\_2} = RA_{inj\_1} \cdot f_1(T_c) \cdot f_2(T_{eg}) \cdot f_3(SOI) \cdot f_4(EGR_{pos})$$

The routine then proceeds to step 800 wherein the rate of change of pedal position is computed as follows:

$$pps\_diff(t) = \frac{(pps(t) - pps(t-1))}{T_s}$$

where $T_s$ is the sampling rate, and
pps(t) denotes the pedal position at time t.
Next, in step 900, a low pass filter is applied to smooth out the noise:

$$pps\_diff\_lp(t) = (1-k_f) \cdot pps\_diff\_lp(t-1) + k_f pps\_diff(t-1)$$

where
$k_f$ controls the rate of filtering. The routine then proceeds to step 1000 wherein the reductant amount is further modified to account for engine transient behaviors as represented by the changes in the pedal position:

$$RA_{inj\_3} = RA_{inj\_2} \cdot f_5(pps\_diff\_lp)$$

where function
$f_5$ is shaped to allow overinjection of reductant during pedal position tip-in and underinjection of reductant during pedal position tip-out. An example of
$f_5$ is shown with particular reference to FIG. 6. In an alternative embodiment, rate of change of engine speed, rate of change of engine fuel injection amount, rate of change of engine load, rate of change of engine fuel demand or any other parameter known to those skilled in the art to provide a measure of engine transient behavior may be used to obtain
$RA_{inj\_3}$. The routine then exits.

In an alternative embodiment (not shown), the modified steady-state reductant injection amount,
$RA_{inj\_2}$, calculated in step 700, is further modified to account for engine transient behavior only if the rate of change of pedal position is greater than a predetermined calibratable value.

Therefore, according to the present invention, in order to achieve a more efficient NOx-reducing catalyst performance, the amount of reductant to be injected should be adjusted to account for increases and decreases in the amount of NOx in the exhaust gas entering the catalyst. This can be accomplished by continuously monitoring engine parameters that are capable of providing a measure of engine transient behaviors, and continuously adjusting the amount of reductant to be injected as a function of these parameters. Since NOx production typically increases at tip-in and decreases at tip-out, the result of such operation would be to increase the base injected amount in the former case, and decrease the base injected amount in the latter case. By monitoring parameters that are capable of providing very quick indication of engine transients, such as, for example, rate of change of pedal position, rate of change of engine fuel injection amount, or rate of change of engine speed or load, it is possible optimize system response and ensure that optimal reductant amount is timely injected into the device in response to a change in engine feedgas NOx.

This concludes the description of the invention. The reading of it by those skilled in the art would bring to mind many alterations and modifications without departing from the spirit and the scope of the invention. Accordingly, it is intended that the scope of the invention be defined by the following claims:

The invention claimed is:

1. A method for controlling reductant injection into a NOx-reducing catalyst coupled downstream of an internal combustion engine, comprising:
   providing an indication that a rate of change of engine speed is greater than a predetermined calibratable constant; and
   in response to said indication, adjusting an amount of reductant injection into the NOx-reducing catalyst based on said rate of change of engine speed.

2. A method for controlling reductant injection into a NOx-reducing catalyst coupled downstream of an internal combustion engine, comprising:
   providing an indication that a (measure of impending engine acceleration) rate of change of an engine operating condition is greater than a predetermined calibratable constant; and
   in response to said indication, adjusting an amount of reductant injection into the NOx-reducing catalyst based on said (measure of impending engine acceleration) rate of change of an engine operating condition.

3. The method as set forth in claim 2 wherein said (measure of impending engine acceleration) rate of change of an engine operating condition is a rate of change of engine speed.

4. The method as set forth in claim 2 wherein said (measure of impending engine acceleration) rate of change of an engine operating condition is a rate of change of engine fuel injection amount.

5. The method as set forth in claim 2 wherein said (measure of impending engine acceleration) rate of change of an engine operating condition is a rate of change of pedal position.

6. The method as set forth in claim 2 wherein said (measure of impending engine acceleration) rate of change of an engine operating condition is a rate of change of engine fuel demand.

7. A method for controlling reductant injection into a NOx-reducing catalyst coupled downstream of an internal combustion engine, comprising:
   adjusting an amount of reductant injection into the catalyst based on a rate of change of an engine operating condition when said rate of change of an engine operating condition is greater than a predetermined calibratable constant.

8. The method as set forth in claim 7 wherein the engine is a diesel engine.

9. The method as set forth in claim 7 wherein the NOx-reducing catalyst is an ALNC.

10. The method as set forth in claim 7 wherein said reductant is hydrocarbon.

11. The method as set forth in claim 7 wherein the NOx-reducing catalyst is an SCR catalyst.

12. The method as set forth in claim 7 wherein said reductant is urea.

13. The method a set forth in claim 7 wherein said rate of change of an engine operating condition comprises a rate of change of pedal position.

14. The method as set forth in claim 7 wherein said rate of change of an engine operating condition comprises a rate of change of engine speed.

15. The method as set forth in claim 7 wherein rate of change of an engine operating condition comprises a rate of change of engine fuel injection amount.

* * * * *